United States Patent [19]
Thompson

[11] Patent Number: 5,053,864
[45] Date of Patent: Oct. 1, 1991

[54] VIDEO CAPTURE, COMPRESSION AND DISPLAY SYSTEM, INCLUDING AVERAGING OF CHROMINANCE INFORMATION

[75] Inventor: Peter A. Thompson, Toronto, Calif.

[73] Assignee: Thompson Electronics Ltd., Toronto, Canada

[21] Appl. No.: 359,813

[22] Filed: Jun. 1, 1989

[51] Int. Cl.$^5$ .................... H04N 9/74; H04N 9/64; H04N 11/06
[52] U.S. Cl. .................... 358/22; 358/21 R; 358/12
[58] Field of Search .................... 358/22, 21 R, 12, 13

[56] References Cited
U.S. PATENT DOCUMENTS

| | | | |
|---|---|---|---|
| 4,530,004 | 7/1985 | Achiha et al. | 358/11 |
| 4,597,005 | 6/1986 | Baleshta et al. | 358/12 |
| 4,613,893 | 9/1986 | Weitzel | 358/11 |
| 4,633,295 | 12/1986 | van de Polder et al. | 358/12 |
| 4,652,903 | 3/1987 | Lucas | 358/11 |
| 4,656,515 | 4/1987 | Christopher | 358/183 |
| 4,689,669 | 8/1987 | Hoshino et al. | 358/80 |
| 4,719,503 | 1/1988 | Craver et al. | 358/12 |
| 4,736,239 | 4/1988 | Sprague et al. | 358/21 |
| 4,740,832 | 4/1988 | Sprague | 358/21 R |
| 4,745,462 | 5/1988 | Dischert et al. | 358/21 |
| 4,758,881 | 7/1988 | Laspada | 358/13 |
| 4,772,938 | 9/1988 | Sasson | 358/21 |
| 4,797,729 | 1/1989 | Tsai | 358/13 |
| 4,814,882 | 3/1989 | Nuimura | 358/22 |

OTHER PUBLICATIONS

Author: Charles L. Cohen Title: NEC Takes an Early Lead in Improved-Definition TV Date: Dec. 17, 1987 From: Electronics pp. 118–120.

Primary Examiner—James J. Groody
Assistant Examiner—Wendy R. Greening
Attorney, Agent, or Firm—Rogers, Bereskin & Parr

[57] ABSTRACT

The system is controlled by a control receiver receiving commands from the external computer across a primary control bus. A captured unit captures digital samples from a composite video signal and transfers them to a memory unit across a capture bus. The memory unit stores samples for two complete frames in four memory banks. The samples are transferred across a data bus to an external computer at addresses given by the computer on an address bus. The computer separates the samples into their luminance, inline and quadrature components, averages the inline component and the quadrature component for an area of two pixels by two pixels. The luminance component and the averaged inline and quadrature component are stored in the memory banks. The samples are stored as 5 luminance bits with 3 inline or quadrature bits for similar addresses in each of the four memory banks. During display all of the luminance and chrominance bits for a given area are latched by the memory unit and read by the display unit. The display unit has two multiplexers selecting the appropriate luminance bits for display for the appropriate pixel in a line and a third multiplexer selecting which line is to be displayed. Luminance, inline and quadrature digital to analog converters receive the selected luminance samples and the averaged inline and quadrature samples, convert them to analog form and transmit them to a luminance, inline and quadrature to red, green and blue matrix for display on a red, green, blue monitor.

19 Claims, 7 Drawing Sheets

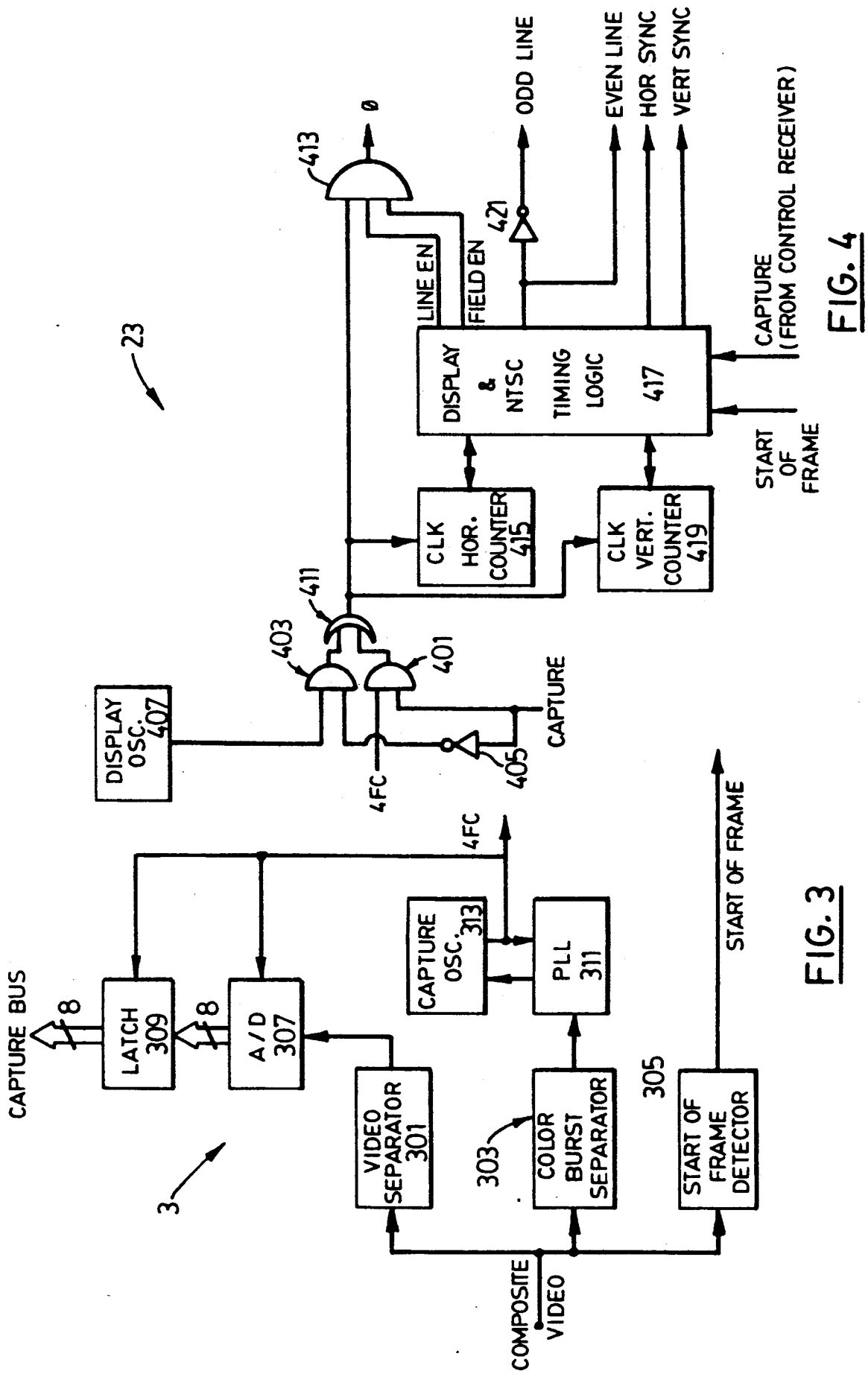

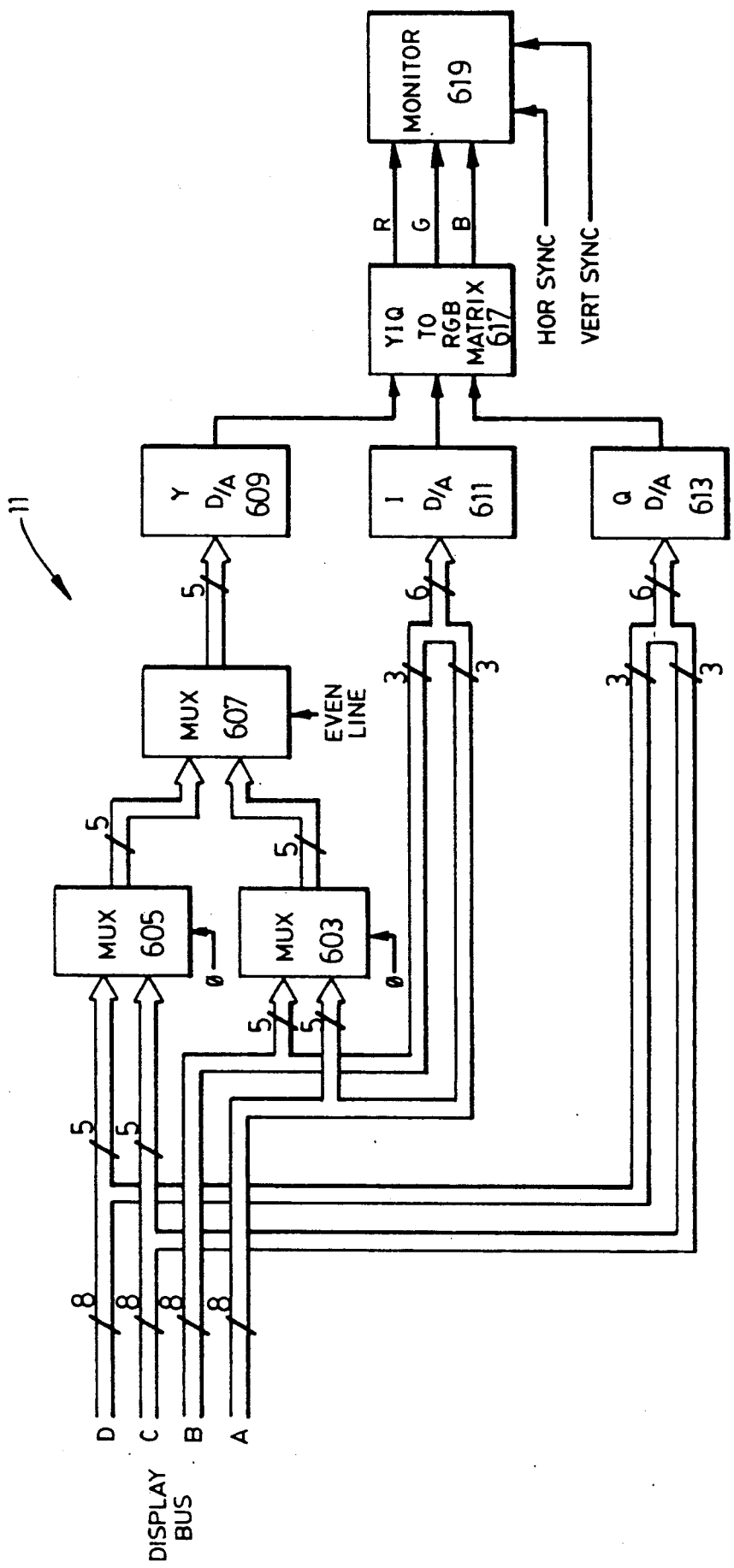

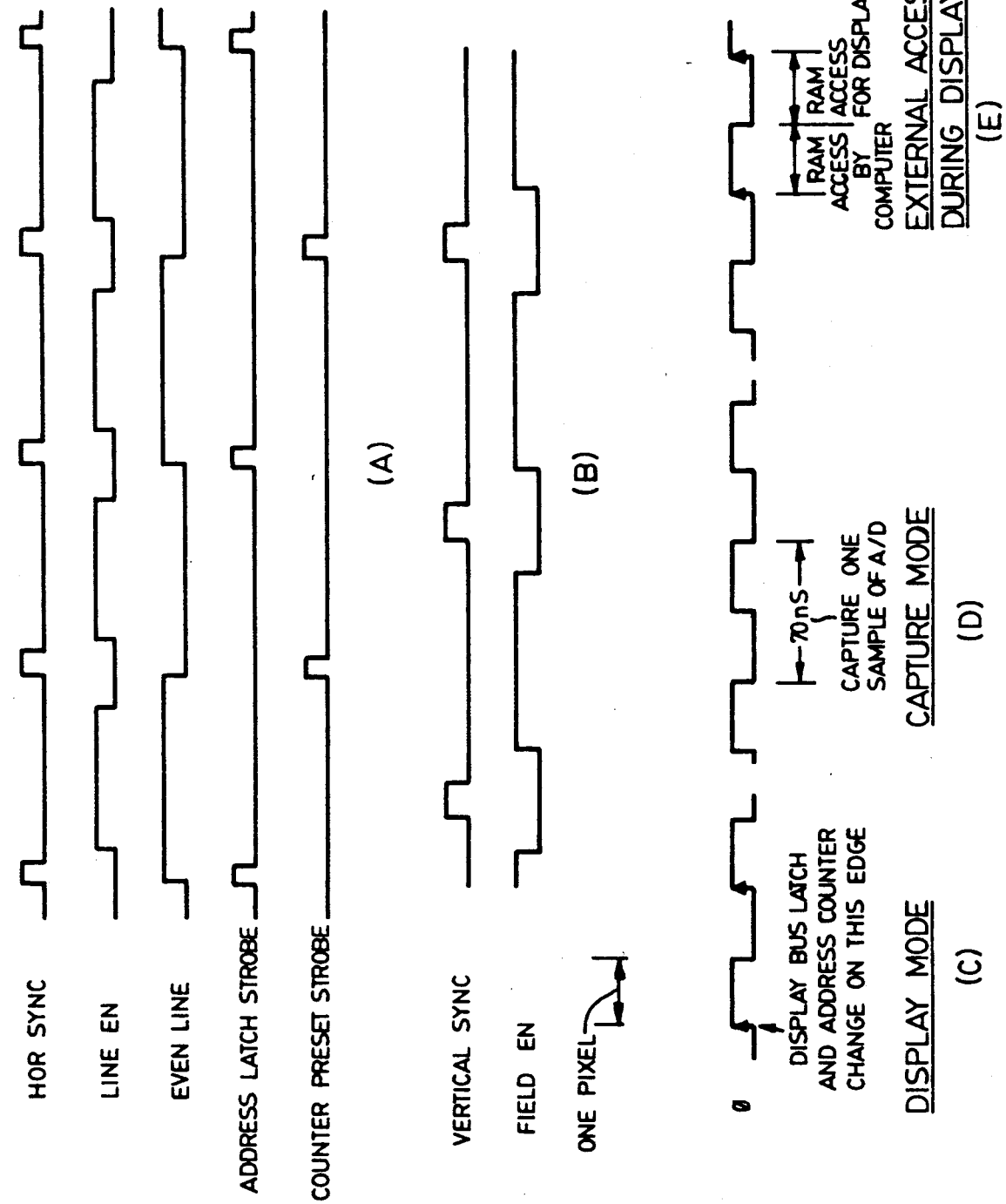

VIDEO CAPTURE, COMPRESSION AND DISPLAY SYSTEM, INCLUDING AVERAGING OF CHROMINANCE INFORMATION

FIELD OF THE INVENTION

This invention relates to the capture and compression of a video signal, including averaging of chrominance information.

BACKGROUND OF THE INVENTION

Many systems are presently known for the capture and display of video information.

At least one of these systems provides for a picture within a picture display. The system is designed to overlay a small picture on the normal frame. The system starts with a digital signal and to create the small picture subsamples one out of five averaged horizontal samples and one out of three averaged lines vertically. The chrominance portion is further averaged over every four subsamples, or pixels, in a line while the luminance for each pixel is retained. However, the picture is distorted from one line to the next by averaging chrominance across one portion of one line without taking into account the chrominance on the next line. This distortion is acceptable in a picture in a picture system where the second picture is meant to be displayed at a reduced size. The chrominance averaging across a line was used as it is simple to implement through time division multiplexing of the reduced video signal.

Another system for the capture and display of video information first separates the chrominance and luminance by ordinary analog separation before they are digitized. It has been shown that this method of separation results in impairment to the picture quality. Digitizing the video signal prior to separation provides a much better separation of the luminance and chrominance components. This method greatly reduces distortion caused by the incomplete separation that is typical of analog separation methods. The same system also averages information over every four pixels in a line creating the distortion discussed above.

Numerous display systems for displaying digitized and separated luminance and chrominance that have been stored in a memory are known. Some systems store the chrominance data in a separate memory.

Also known are systems that digitize the video information and store the data in a frame memory. This allows the video to be separated digitally. These systems however use various circuits to implement the separation instead of using a computer that can employ more complicated manipulations to handle noise and motion effects.

None of the systems allow for the efficient use of data with averaging of chrominance over an area, nor do they allow for the accessing of captured and stored information by an external computer for separation into component parts and averaging or for graphical manipulation of the information.

SUMMARY OF THE INVENTION

In a first aspect the invention provides a video system for use in association with video information from a composite video signal, the system comprising:
  a capture unit for capturing and digitizing video information from a composite video signal; and
  a manipulation block for separating the composite, digitized video information into a luminance portion and a chrominance portion, for separating the samples of the chrominance portion into samples of first and second chrominance, and for averaging samples of the first and second chrominance portions of the captured video information over a given area, while retaining unaveraged the luminance portion of the captured video information of the area, the area encompassing video information from more than one line of the captured video information.

BRIEF DESCRIPTION OF THE DRAWINGS

For a better understanding of the present invention the preferred embodiment thereof will be described with reference to the accompanying drawings wherein:

FIG. 3 is a block diagram of a capture unit employed in the system of FIGS. 1 and 2;

FIG. 4 is a block diagram of a timing block employed in the system of FIGS. 1 and 2;

FIG. 6 is a block diagram of display unit employed in the system of FIGS. 1 and 2; and FIG. 7 is a timing diagram of signals in the system of FIGS. 1 and 2.

DETAILED DESCRIPTION OF THE PREFERRED EMBODIMENT

Figure 1:
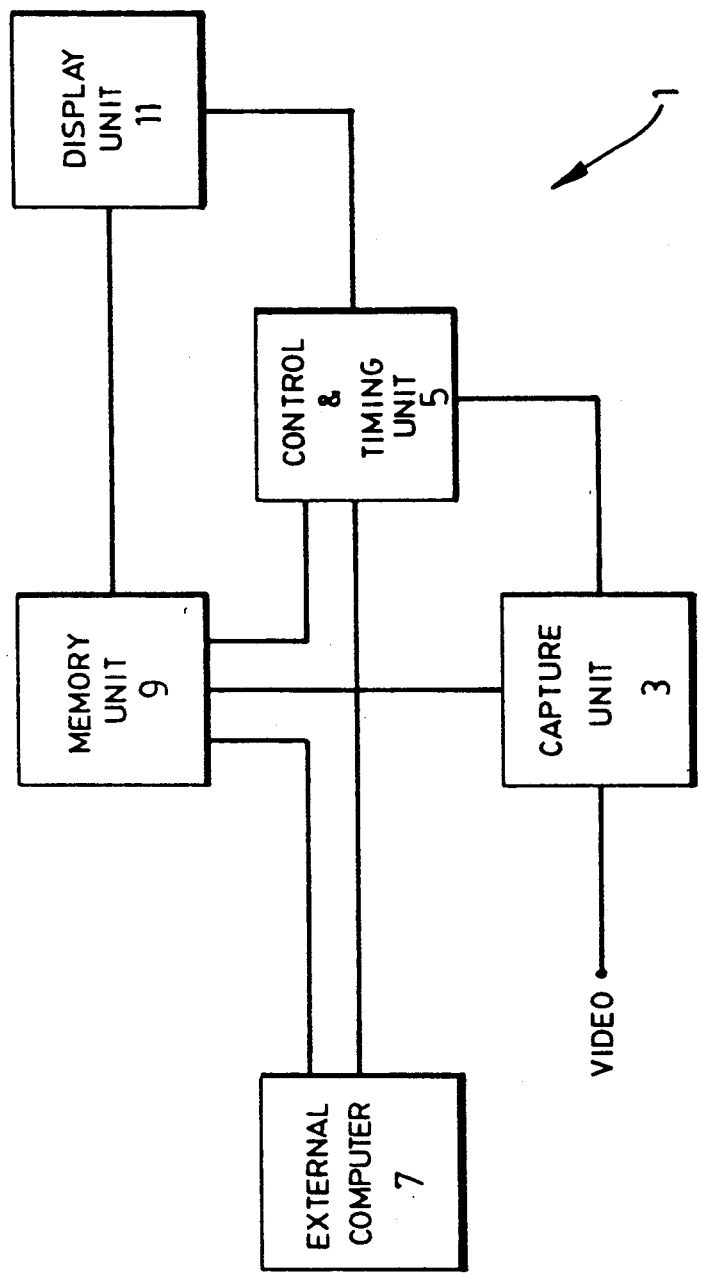
FIG. 1 is a block diagram of a capture, storage, manipulation and display system according to the preferred embodiment of the present invention.

Referring to FIG. 1, a capture, storage, manipulation and display system 1 has a capture unit 3, control and timing unit 5, external computer 7, memory unit 9, and display unit 11.

The capture unit 3 has a composite VIDEO signal input and is connected to the memory unit 9 and the control and timing unit 5. The control and timing unit 5 is further connected to the computer 7, memory unit 9 and display unit 11. The computer 7 is also connected to the memory unit 9. The memory unit 9 is additionally connected to the display unit 11.

In operation, the computer 7, either through its operator or through a program (not shown), determines what the system 1 is to do next. The system 1 can either capture video information and store it, manipulate stored information and restore it, or display stored information. The computer 7 informs the control and timing unit 5 of the operation. The control and timing unit 5 controls the other units 3, 9, 11 accordingly, until the computer 7 changes the operation.

During capture, the capture unit 3 captures video information from the COMPOSITE VIDEO signal and transfers it directly to the memory unit 9.

During manipulation, the computer 7 can access the memory unit 9. In the preferred embodiment the computer acts as a manipulation block. It will be obvious to those skilled in the art that for other embodiments, depending on the manipulation required, the manipulation block could be implemented through hardware or other means.

During display, the memory unit 9 feeds the display unit 11.

Figure 2:
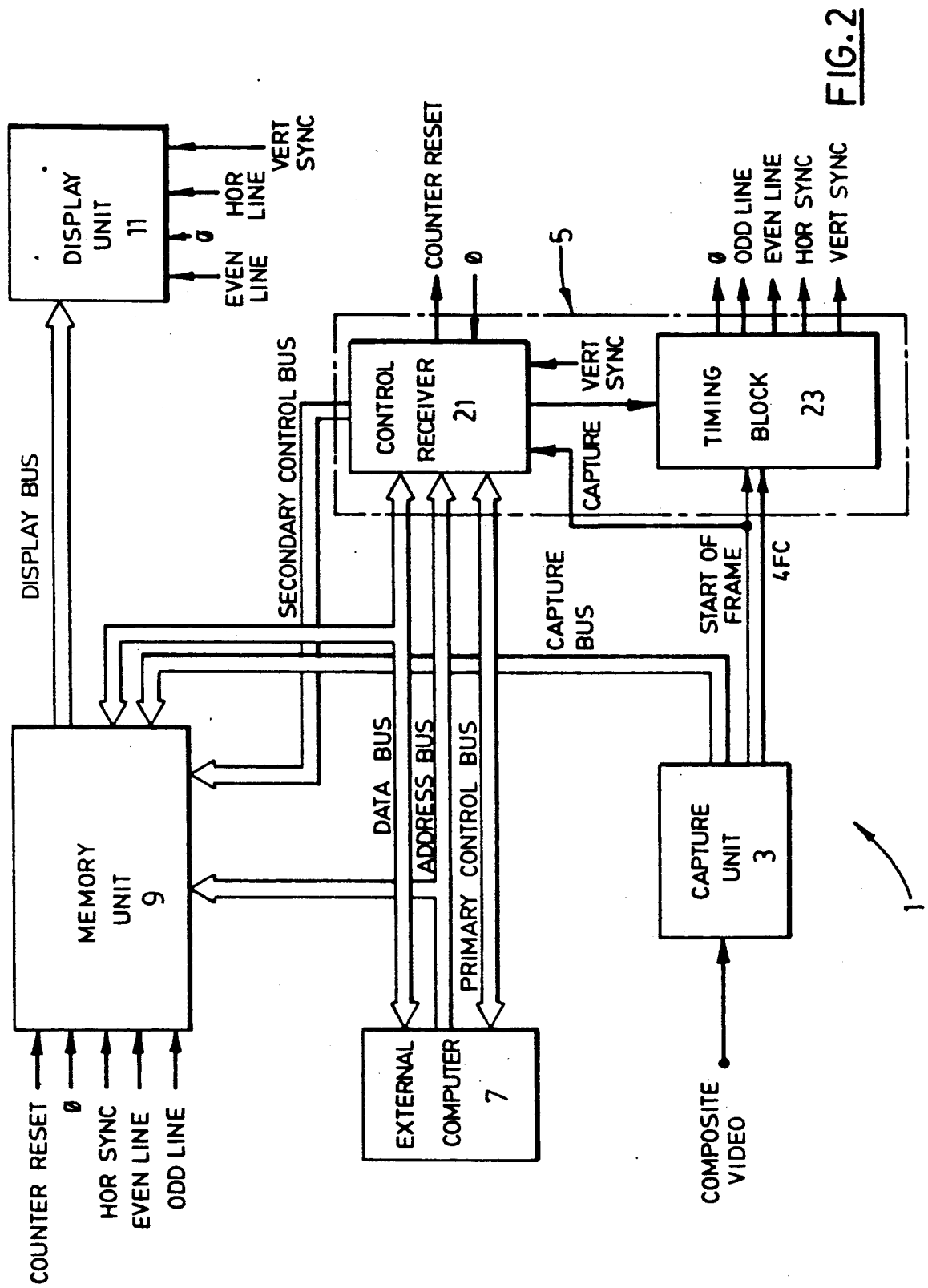
FIG. 2 is a detailed block diagram of the system of FIG. 1.

Referring to FIG. 2, the control and timing unit 5 is outlined in dashed lines. The control and timing unit 5 has a control receiver 21 and a timing block 23. The timing block 23 has a START OF FRAME signal input, a 4Fc signal input and a CAPTURE signal input. The timing block 23 has clock signal output Φ. The timing block 23 has horizontal and vertical synchronization signal outputs, HOR SYNC and VERT SYNC. The timing block further has an EVEN LINE and ODD LINE signal output.

The control receiver 21 has START OF FRAME signal, VERT SYNC signal, and Φ inputs. The control receiver 21 has COUNTER RESET and CAPTURE signal outputs.

The control receiver 21 and the computer 7 are connected to a PRIMARY CONTROL BUS. The control receiver 21, computer 7 and memory unit 9 are connected to an ADDRESS BUS and to a DATA BUS. The control receiver 21 and memory unit 9 are connected to a SECONDARY CONTROL BUS. The capture unit 3 and memory unit 9 are connected to a CAPTURE BUS. The display unit 11 and memory unit 9 are connected to a DISPLAY BUS.

The capture unit 3 has START OF FRAME and 4Fc signal outputs. The memory unit 9 has COUNTER RESET, HOR SYNC, ODD LINE, EVEN LINE and Φ signal inputs. The display unit 11 has Φ, EVEN LINE, HOR SYNC and VERT SYNC signal inputs.

As discussed previously, the system 1 can either capture, manipulate or display video information. Thus, the system has three modes of operation which will be referred to as CAPTURE, EXTERNAL and DISPLAY. The mode of operation is sent by the computer to the control receiver 21 across the DATA BUS, at a given address of the ADDRESS BUS and given control bus condition on the PRIMARY CONTROL BUS, in the form of a control byte. The control byte is latched in the control receiver 21 and does not change until another control byte is sent.

During a capture sequence a capture command is sent by the computer 7 to the control receiver 21 as a control byte. The capture unit 3 continuously examines incoming VIDEO signals. When the capture unit 3 detects the beginning of a frame, the capture unit 3 activates the START OF FRAME signal. The control receiver 21 receives the START OF FRAME signal and, when the control byte has a capture command, activates the CAPTURE signal for two frames of the video signal. The control receiver 21 informs the memory unit 9 of the capture operation via the SECONDARY CONTROL BUS, and can reset the memory unit 9 via the COUNTER RESET signal. The capture unit 3 digitizes the VIDEO signal and transfers it over the CAPTURE BUS. The memory unit 9 counts and addresses the pixels as they come from the CAPTURE BUS and stores them.

During an external computer access, or manipulation, sequence the control byte in the control receiver 21 is set for external mode by the computer 7. The control receiver 21 via the SECONDARY CONTROL BUS directs the memory unit 9 to connect to the ADDRESS BUS and the DATA BUS. The computer 7 can then read captured information from, and write captured information which has been manipulated to, the memory unit 9.

In the display mode, the computer 7 changes the control byte in the control receiver 21. The control receiver 21 informs the memory unit 9 via the SECONDARY CONTROL BUS. The memory unit 9 uses a counter to sequentially address the stored data of the pixels to be displayed and transfers this data via the DISPLAY BUS to the display unit 11 for display.

During the display mode, the computer 7 can access the memory unit 9 on a limited time shared basis as will be discussed later.

Referring to FIG. 3, the capture unit 3 receives the COMPOSITE VIDEO signal and transfers it to a video separator 301, a colour burst separator 303 and a start of frame detector 305. The video separator 301 is connected through an analog to digital converter 307 and a latch 309 to the CAPTURE BUS. The colour burst separator 303 is connected to a phase locked loop 311. The phase locked loop 311 connects to a capture oscillator 313. The output of the oscillator 313 is the 4Fc signal and is connected to the converter 307 and the latch 309. The start of frame detector 305 outputs the START OF FRAME signal.

The capture unit 3 has been designed for an NTSC VIDEO signal. As will be obvious to those skilled in the art, for VIDEO signals in other formats, such as PAL or SECAM, the operation of the captured unit 3 may have to be modified, however the modification should not affect the basic principles behind the system 1.

In operation, the capture unit 3 detects the start of a frame via the start of frame detector 305. The start of a frame in an NTSC format is the beginning of an odd field. The video separator 301 separates the video signal from the COMPOSITE VIDEO signal. The converter 307 converts the separated video signal to digital form. 8 bits have been used in the preferred embodiment so as to provide a sufficient signal to noise ratio.

The sampling by the converter 307 must occur at a given phase angle from the reference colour burst of the VIDEO signal in order for the NTSC I (inline) and Q (quadrature) components to be easily obtained. The need for these components, I and Q, will become evident later. The separator 303 separates out the colour burst which controls the phase looked loop 311. The phase looked loop 311 in turn controls the frequency and phase of the oscillator 313. The oscillator 313 operates at four times the colour subcarrier frequency (3.57 MHz) to produce the 4Fc signal (14.38 MHz).

The digitized video data is held stable by latch 309 for each write cycle to the memory unit 9.

Referring to FIG. 4, the timing block 23 receives the 4Fc signal and the CAPTURE signal at AND gate 401. AND gate 403 has inputs from the CAPTURE signal inverted by inverter 405 and a display oscillator 407. The outputs of the AND gates 401, 403 are ORed by an OR gate 411. The output of the OR gate 411 is input to an AND gate 413, a clock input to a horizontal counter 415 and a clock input to a vertical counter 419. The horizontal counter 415 is connected to display and capture timing logic 417. The vertical counter 419 has other connections to the logic block 417. Counters 415 and 419 are synchronous counters.

The logic block 417 also receives the START OF FRAME and CAPTURE signals. The logic block 417 further outputs a line enable (LINE EN) signal, a field enable (FIELD EN) signal, the EVEN LINE signal and the HOR SYNC and VERT SYNC signals.

The LINE EN and FIELD EN are input to the AND gate 413. The output of the AND gate 413 is the Φ signal.

The EVEN LINE signal is an input signal, to an inverter gate 421, creating an ODD LINE signal.

The display oscillator 407 is the source for the system clock Φ in the display mode. This oscillator 407 has a period equal to the time required to scan two pixels.

Gates 401, 403, 405 and 411 select 4Fc as the clock for the counters 415, 419 when in the capture mode since the CAPTURE line is at a logic high state. The period of the 4Fc clock is the time between samples of the A/D converter 307 (FIG. 3) and corresponds to the rate at which the CAPTURE BUS is updated.

Horizontal counter 415 advances one count for each clock period from OR gate 411. It reaches full count at the end of a display line and then starts over. Vertical counter 419 is used to count the number of lines in a field. Some time periods in a line and between fields contain no video information and during these periods no information need be stored or displayed. The logic block 417 detects these time periods and outputs a logic low level on LINE EN and FIELD EN signals when they occur. LINE EN and FIELD EN are input to the AND gate 413 s that the Φ output can be disabled when the horizontal counter 415 is outside a line or the vertical counter 419 is outside a field.

The logic block 417 sets the EVEN LINE to a logic high level when an even line is being counted.

During capture mode the logic block 417 is configured, by a high logic level on the CAPTURE line, to duplicate the NTSC interlaced sync component timing specification. The timing state of the counters 415 and 419 is brought into coincidence with the COMPOSITE VIDEO signal sync component by the START OF FRAME signal. The sync timing state is kept locked in coincidence by phase locked loop 311 of FIG. 3, which is controlled by the color burst of the COMPOSITE VIDEO input.

For a complete capture sequence vertical counter 419 counts from the start of an odd field, through four consecutive fields (two frames).

Figure 5A:
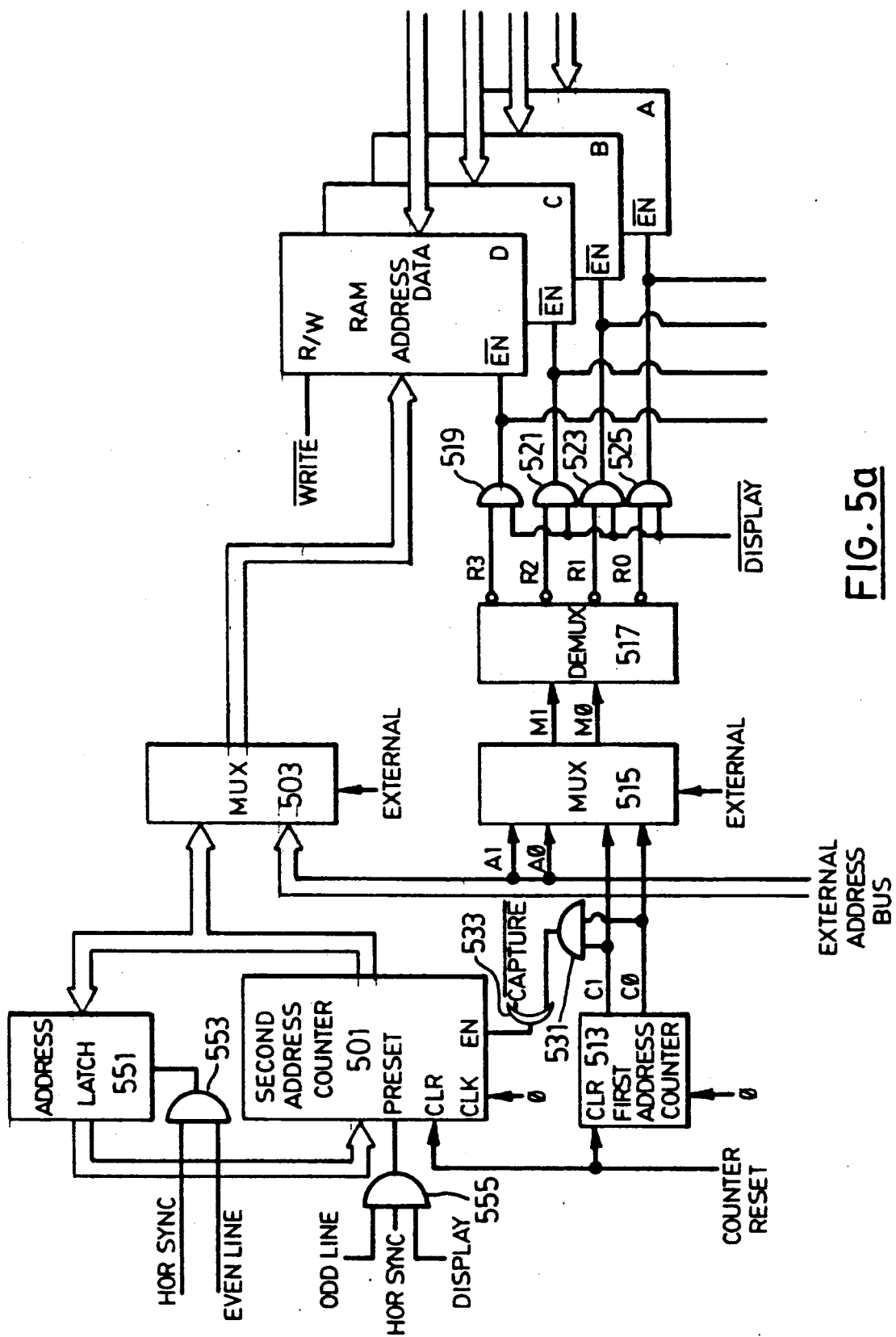
FIGS. 5A and 5B are block diagrams of a memory unit employed in the system of FIGS. 1 and 2.
Figure 5B:
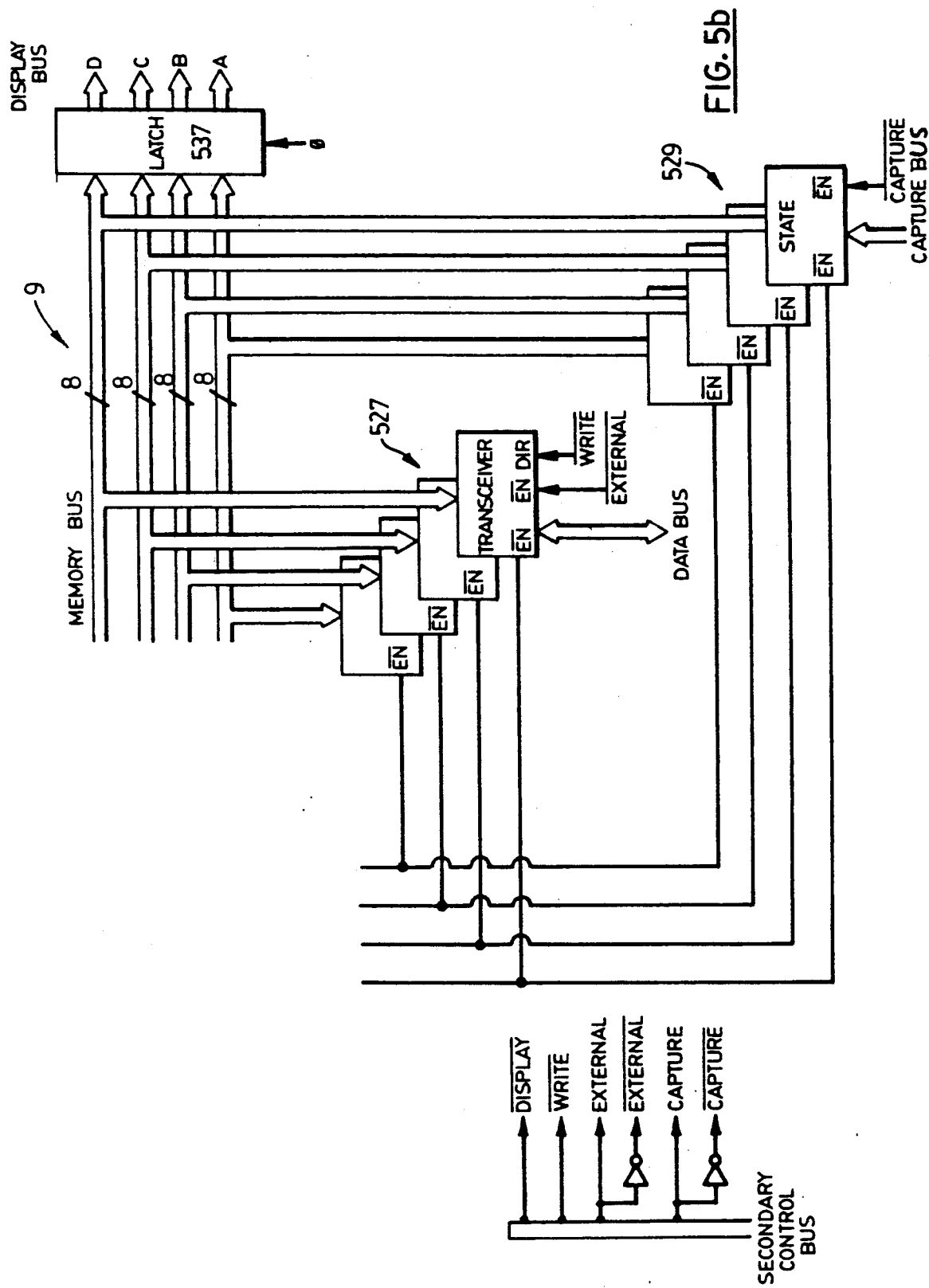

Referring to FIG. 5, the SECONDARY CONTROL BUS is decoded into $\overline{DISPLAY}$, $\overline{WRITE}$, EXTERNAL, $\overline{EXTERNAL}$, CAPTURE and $\overline{CAPTURE}$ signals.

The memory unit 9 has four memory banks A, B, C, D. The banks A, B, C, D can be connected to the ADDRESS BUS or to a second address counter 501 through a multiplexer 503. The multiplexer 503 is controlled by the EXTERNAL signal. The banks A, B, C, D have not enable ($\overline{EN}$) inputs, each $\overline{EN}$ input receives a signal derived from either a first address counter 513 or the two lowest address lines from the ADDRESS BUS. Multiplexer 515 selects either the counter 513 output or the two lowest lines of the ADDRESS BUS, according to the EXTERNAL signal. The multiplexer 515 is followed by a two line to four line demultiplexer 517 with inverted outputs. Each demultiplexer 517 output is an input to an AND gate 519, 521, 523, 525, along with the $\overline{DISPLAY}$ signal.

Each memory bank A, B, C, D is connected to its own MEMORY BUS. Four transceivers 527 connect the DATA BUS to the MEMORY BUSES and four 3-state buffers 529 connect the CAPTURE BUS to the MEMORY BUSES. The MEMORY BUSES are also connected to latch 537 controlled by Φ.

Each memory bank A, B, C, D receives the $\overline{WRITE}$ signal.

The transceivers 527 receive the same ($\overline{EN}$) signals at one of their enable inputs ($\overline{EN1}$) as the banks A, B, C, D. The other of their enable inputs ($\overline{EN2}$) receives the $\overline{EXTERNAL}$ signal. The direction of the transceivers 527 is determined by the $\overline{WRITE}$ signal. Both EN1 and EN2 must be at a logic low for the transceivers 527 or buffers 529 to be active.

The buffers 529 also receive the same ($\overline{EN}$) signals at one of their enable inputs ($\overline{EN1}$) as the banks A, B, C, D. The other enable inputs ($\overline{EN2}$) are connected to the $\overline{CAPTURE}$ line.

The first address counter 513 outputs are connected through an AND gate 531 and an OR gate 533, along with the $\overline{CAPTURE}$ signal, to an enable input EN of the synchronous counter 501. The counters 501, 513 each receive the Φ signal at their clock (CLK) inputs. The second address counter output is connected to an address latch 551. The control of latch 551 comes from an AND gate 553 which has HOR SYNC and EVEN LINE inputs. The output of latch 551 goes to preset inputs of the second address counter 501. Counter 501 has a preset control that comes from AND gate 555 with inputs of ODD LINE, HOR SYNC and DISPLAY.

In operation during a capture sequence, counters 501, 513 act as a single synchronous counter as $\overline{CAPTURE}$ would be at a logic low state and gates 531, 533 would connect the counters. Multiplexer 503 would connect the counter 501 addresses to the banks A, B, C, D as EXTERNAL is at a logic low level. Multiplexer 515 would connect counter 513 output lines $C_0$ and $C_1$ to its output lines $M_0$ and $M_1$ as EXTERNAL is at a logic state. Demultiplexer 517 takes the two bit binary input ($M_0$ and $M_1$) and uses the number to select which of the corresponding outputs ($R_0$, $R_1$, $R_2$, $R_3$) to set to a logic low state. These outputs are ANDed with the $\overline{DISPLAY}$ line which would be at a logic high state during a CAPTURE sequence. Therefore during a CAPTURE sequence the counter 513 will cause each memory bank A, B, C, D to become enabled sequentially as the clock Φ counts each sample of captured data on the CAPTURE BUS. When the counter 513 reaches the count of three, AND gate 531 and OR gate 533 will enable the second address counter 501 as $\overline{CAPTURE}$ is at a logic low level. The counter 501 will then advance causing the address lines to select the next memory location of memory banks A, B, C, D. During a CAPTURE sequence the buffers 529 will be enabled as $\overline{CAPTURE}$ is at a logic low level and the $\overline{WRITE}$ will be at a logic low enabling the memory banks to write. Captured video data will be transferred to the enabled memory bank at the address of counter 501.

In operation during an external sequence, the computer 7 has access to memory banks A, B, C, D. Multiplexer 503 connects the ADDRESS BUS to the memory banks A, B, C, D as the EXTERNAL line would be at a logic high state. The two least significant ADDRESS BUS lines ($A_0$, $A_1$) connect to the multiplexer 515 output ($M_0$, $M_1$) as the EXTERNAL line would be at a logic high state. Demultiplexer 517 selects which of its four output lines ($R_0$, $R_1$, $R_2$, $R_3$) will be set to a logic low. Since the $\overline{DISPLAY}$ line is at a logic high level the AND gates 519, 521, 523, 525 will pass the logic level of the demultiplexer outputs to each memory bank enable ($\overline{EN}$). One of the memory banks A, B, C or D, will therefore be enabled as determined by the state of the two least significant bits of the computer ADDRESS BUS.

During an EXTERNAL sequence the four transceivers 527 connect the computer 7 DATA BUS to the MEMORY BUSES as $\overline{EXTERNAL}$ is at a logic low level. The MEMORY BUS of the enabled memory bank A, B, C or D will be connected to the corresponding transceiver 527 that is enabled. When the computer 7 is in a write mode the $\overline{\text{WRITE}}$ line will be at a logic low state. This will allow the enabled memory bank A, B, C or D to write the MEMORY BUS data, it will also select the direction of the enabled transceiver 527 so that the DATA BUS data is put onto the enabled MEMORY BUS section. When the computer 7 is in a read mode the $\overline{\text{WRITE}}$ line will be at a logic high state. This will allow the enabled memory bank A, B, C, or D to read the MEMORY BUS data, it will also select the direction of the enabled transceiver 527 so that the enabled MEMORY BUS data is put onto the DATA BUS.

The computer 7 is used by the system 1 to perform the following manipulation functions. It is used, after a capture sequence, to separate the captured digitized video into luminance (Y), inline (I) and quadrature (Q) components. The computer 7 then averages the I and Q values from a pair of lines. It rearranges the Y, I, Q data in groups of four pixels with 8 bits per pixel. This display data can then be written to memory unit 9 in the form of a memory word for each group for storage and later display. The computer 7 can employ routines to detect or minimize the effects of frame to frame image motion and can use complicated routines to minimize noise. The computer 7 is used for graphical manipulation of the stored data by a graphics operator and for the transfer and retrieval of data images to or from a mass storage device, not shown.

Following a capture sequence, the data stored in memory unit 9 is a direct digitized version of the composite VIDEO (less the sync components) for four consecutive fields (two frames). This captured data is separated by the computer 7 into its luminance and chrominance (C) parts, the chrominance is further separated into the I and Q components. It is possible to also use the television color difference signals red minus luminance (R−Y) and blue minus luminance (B−Y) in place of I and Q.

For general graphical manipulations, it is advantageous to be able to separately control the chrominance and luminance information. This allows the graphics operator to change the hue of a person's hair without changing the features of the hair which are contained in the luminance information.

The analog to digital converter 307 samples the video four times for each cycle of the color subcarrier. The computer can obtain the luminance and chrominance information by digitally adding and subtracting the values of video samples obtained for the same positions in two successive frames. This is possible as the color subcarrier is out of phase by 180 degrees between two successive frames. Two times the luminance value will be obtained by adding samples since the color subcarrier data will cancel out. To further obtain the I and Q components requires that phase lock loop 311 (FIG. 3) be locked to the subcarrier reference and the phase adjusted so that analog to digital sampling can occur at a given subcarrier angle. Subtracting samples between frames will then produce the value of the magnitude of the I and Q. I and Q will alternate with successive samples.

For the human eye, it has been shown that less chrominance information is required relative to luminance information for a color image. Having a single chrominance value over a given area that has more than one luminance value will exploit this characteristic of the eye. However, the same benefit can not be obtained by having a single chrominance value over a line that has more than one luminance value as distortion will be evident to the eye from one line to the next.

The balance between simplest implementation versus best quality has been found to be a 4:1 ratio of luminance to chrominance over a given area.

The implementation of area chrominance averaging can be done as follows by the computer 7 after separating the Y, I and Q. Two consecutive samples on a line of digitized video are needed to obtain an I and Q value. These values of I and Q are separately averaged with I and Q values obtained from the value of the sample on the line directly below. Since the video signal is interlaced the line directly below will be in the other field of the frame. The averaged values result in a single chrominance for the four samples in the group. Each digitized video sample corresponds to one pixel for display.

It has been found that 6 bits each of I and Q for each group of four pixels allow enough color combinations to obtain a high quality display. Also it has been found that having 5 bits of luminance data and having a resolution of one pixel for each captured digital sample provides enough luminance information to obtain a high quality display.

The 12 bits of chrominance information (I and Q) are equally distributed as 3 bits among the four pixels. Including the 5 bits of luminance there is a total of 8 bits of data per pixel. The 32 bits of data per group form a memory word for the purposes of this disclosure. The three most significant bits (MSB) of the 8 bits of pixel data are assigned to the chrominance. Assuming the first line is an even line and the first pixel of a group of pixels is an even pixel then: the even line-even pixel gets the three MSB of I; the even line-odd pixel gets the three least significant bits (LSB) of I; the odd line-even pixel gets the three MSB of Q; and the odd line-odd pixel gets the three LSB of Q.

Referring to FIG. 6, part A and B of the DISPLAY BUS each connect five of eight lines to multiplexer 603. The other 3 of A and B go to the inline digital to analog converter (I D/A) 611. Parts C and D of the DISPLAY BUS connect five of eight lines to multiplexer 605 and the other three go to the quadrature D/A converter (Q D/A) 613. Multiplexer 605 and 603 are controlled by the Φ line, their outputs are connected to multiplexer 607 which is controlled by the EVEN LINE signal. The output of multiplexer 607 connects to the Y D/A converter 613.

The converters 609, 611, 613 are connected through a YIQ to RGB matrix 617 to display monitor 619. The monitor 619 has inputs for the HOR SYNC and VERT SYNC signals.

In operation for a display sequence, the $\overline{\text{DISPLAY}}$ line signal of FIG. 5 is set at a logic low level which causes AND gates 519, 521, 523 and 525 to output a logic low. This enables all of the memory banks A, B, C, D. The $\overline{\text{WRITE}}$, $\overline{\text{EXTERNAL}}$ and $\overline{\text{CAPTURE}}$ are at a logic high disconnecting the MEMORY BUSES from the DATA BUS and CAPTURE BUS. As all memory banks A, B, C, D are enabled during display, counter 513 has no effect. Also as $\overline{\text{CAPTURE}}$ is at a logic high level, the OR gate 533 keeps the synchronous counter 501 continuously enabled during display mode. Counter 501 is cleared by the COUNTER RESET line from control receiver 21. This line is activated in the display mode during the vertical sync time period so as to start the display unit 11 scanning at the top right corner of its screen.

At each rising edge of the clock Φ, the synchronous counter 501 advances one count and addresses the next group of four pixels. The period of Φ is the time to display two pixels. The rising edge of Φ also latches the data for a group of four pixels in latch 537. This makes data parts A, B, C, D available on the DISPLAY BUS corresponding to data from memory banks A, B, C, D. The DISPLAY BUS section A is an even line-even pixel, B is an even line-odd pixel, C is an odd line-even pixel and D is an odd line-odd pixel.

From FIG. 6 it can be seen how the memory word on the 32 bit DISPLAY BUS is broken into 6 bits each of I and Q data and 5 bits of Y data. Since the chrominance data is common for the group of four pixels it does not depend on Φ or EVEN LINE. Six bits of I data come from the A and B memory banks and six bits of Q data come from the C and D memory banks. Even pixels are displayed at a logic high level of Φ therefore the luminance of memory banks A and C are selected by multiplexer 603 and 605 when Φ is at a logic high. Odd pixels from memory banks B and D are like wise selected when Φ is at a logic low. The outputs of multiplexer 603 and 605 are input to multiplexer 607 which selects the output from multiplexer 603 when EVEN LINE is at a logic high. The output of multiplexer 603 is connected to the Y D/A converter by multiplexer 607.

Memory banks A, B, C, D hold the memory word containing data for both the even and odd scan lines at the same address therefore it is necessary to scan the same address in memory twice for each pair of lines. When an even line is scanned multiplexer 607 will select the luminance for the even line. The chrominance for each group is common to both lines of the pair. The method used to scan memory twice for each pair of lines can be seen in FIG. 5 and from timing diagram FIG. 7 (a). At the start of an even line the address in counter 501 is latched into address latch 551 by a strobe from the HOR SYNC. AND gate 553 produces this strobe. At the start of an odd line the data from latch 551 is input into the preset inputs of address counter 501. Presetting the counter 501 sets the count value equal to the input preset value. Preset occurs at the time of the strobe pulse and is derived from the AND gate 555 which has inputs of ODD LINE, DISPLAY and HOR SYNC. Rescanning the memory is only required during DISPLAY mode.

The YIQ to RGB matrix 617 converts the Y, I, Q analog levels into R, G, B signals for the monitor 619 by applying NTSC standard equations.

During the display mode, logic (not shown) in the control receiver 21 (see FIG. 2) allows the computer 7 to access the memory unit 9. The memory unit 9 is time shared between the display function and external access by computer 7. This allows graphic manipulation of the information being displayed on the monitor 619 without interrupting the display. Latch 537 (FIG. 5) holds the display data for two pixels (per line) and is updated only on the rising edge of Φ. This provides free time to the memory unit 9 allowing it to be accessed by the computer 7 when Φ is at a logic high level. Control receiver 21 will set $\overline{\text{DISPLAY}}$ and EXTERNAL to a logic high when Φ is at a logic high and will set $\overline{\text{DISPLAY}}$ and EXTERNAL to a logic low when Φ is at a logic low.

The method described for implementing memory unit 9 requires the use of Random Access Memories (RAM) with fast access times. Changes to the design of memory unit 9 to allow for use with different RAM configurations will not affect the general principles of operation of memory unit 9.

Alternate embodiments of the invention than the preferred embodiment described herein will be obvious to those skilled in the art and will fall within the spirit and scope of the invention as defined by the following claims.

I claim:

1. A video system for use in association with video information from a composite video signal, the system comprising:
    a capture unit for capturing and digitizing video information from a composite video signal;
    a manipulation block for separating the composite video information into a luminance portion and a chrominance portion, for separating the samples of the chrominance portion into samples of first and second chrominance, and for averaging the first and second chrominance samples of the video information over a given area, while retaining unaveraged samples of the luminance portion of the video information of the area, the area encompassing video information from more than one line of the video information; and a display unit for displaying the averaged samples of the chrominance portion and for displaying the samples of the luminance portion, the chrominance and luminance portions for a given area being stored in a memory word, wherein during display a sample of the luminance portion is read once for each corresponding pixel in the area and the chrominance samples are read once for each line in the area, the memory word being read from memory once for each line in the area during display.

2. A video system according to claim 1, wherein the ratio of the areas covered by each sample of the luminance portion to each averaged sample of the chrominance portion is one to four.

3. A video system according to claim 1, wherein the manipulation block separates the samples of first and second chrominance components into samples of inline and quadrature components.

4. A video system according to claim 3, wherein the samples of the luminance portion and the inline and quadrature components are stored after they are separated and during display a sample of the luminance portion is read once for a corresponding pixel in the area and the inline and quadrature samples are read once for each line in the area.

5. The video system of claim 4, the display unit further comprising, one first multiplexer for each line in the area selecting samples of the luminance portion from the stored portions for each pixel in its corresponding line, and one second multiplexer for selecting which line is being displayed.

6. The video system of claim 4, wherein the area is two lines by two pixels, the display unit comprising, first and second multiplexers, the first multiplexer selecting samples of the luminance portion from the stored portion for each pixel in a first alternate line in the area, the second multiplexer selecting luminance information for each pixel in a second alternate line in the area, and a third multiplexer for selecting which alternate line is being displayed.

7. A video system according to claim 6, the display unit further comprising quadrature, inline and luminance digital to analog converters, the quadrature and inline converters converting the inline and quadrature digital samples to analog form and the luminance converter converting the selected luminance samples to analog form.

8. A video system according to claim 7, the display unit further comprising a luminance, inline and quadrature to red, green and blue matrix for transforming the analog forms of the luminance portion, and inline and quadrature components to red, green and blue signals.

9. A video system according to claim 1, further comprising a memory unit for storing captured video information.

10. A video system according to claim 9, wherein the manipulation block includes, an external computer, the computer accessing the stored video information of the memory unit.

11. A video system according to claim 10, wherein the memory unit comprising: four memory banks storing captured video information from the capture unit; the computer accessing the memory unit to separate the captured video information into luminance, inline and quadrature components, to average the inline component and to average the quadrature component over the given area and to access the memory unit to store the separated and averaged components; the display unit displaying the luminance and averaged inline and quadrature components from the memory unit.

12. A video system for use in association with video information from a composite video signal, the system comprising: a memory unit for storing video information comprising a luminance portion and a chrominance portion separated into samples of first and second chrominance, with the first and second chrominance samples averaged over a given area and samples of the luminance portion of that area being retained unaveraged, the area encompassing video information for more than one line of video information and the chrominance and luminance portions for a given area being stored in a memory word; and a display unit for displaying the average samples of the chrominance portion, wherein during display a sample of the luminance portion is read once for each corresponding pixel in the area and the chrominance samples are read once for each line in the area, the memory word being read once for each line in the area during display.

13. A video system as claimed in claim 12 and including:

one first multiplexer for each line in the area selecting samples of the luminance portion for each pixel in its corresponding line, and one second multiplexer for selecting which line is being displayed.

14. A video system according to claim 13, wherein the display unit further comprises luminance and chrominance digital to analog converters, the luminance converter converting the selected luminance samples to analog form and the chrominance converter converting the chrominance samples to analog form.

15. A video system for use in association with video information consisting of digital samples of a luminance portion for each pixel in a given area, a digital sample of a first chrominance component for the area and a digital sample of a second chrominance component for the area, the area being two lines by two pixels, the system comprising;

a display unit including, first and second multiplexers, the first multiplexer selecting samples of the luminance portion for each pixel in a first alternate line in the area, the second multiplexer selecting luminance information for each pixel in a second alternate line in the area, and a third multiplexer for selecting which line is being displayed.

16. A video system according to claim 15, the display unit further including: first chrominance component, second chrominance component and luminance digital to analog converters, the converters converting the first and second chrominance component samples and the selected luminance samples to analog form.

17. A video system according to claim 16, wherein the first and second chrominance components are inline and quadrature components.

18. A video system according to claim 17, wherein the display unit further includes a luminance, inline and quadrature to red, green and blue matrix for transforming the analog forms of the luminance portion and the inline and quadrature components to red, green and blue signals.

19. A video system according to claim 18, wherein the selected samples of the luminance portion are fed to the luminance converter at twice the rate at which the samples of the inline and quadrature components are fed to the inline and quadrature converters.

* * * * *

UNITED STATES PATENT AND TRADEMARK OFFICE
CERTIFICATE OF CORRECTION

PATENT NO. : 5,053,864

DATED : October 1, 1991

INVENTOR(S) : Peter A. Thompson

It is certified that error appears in the above-identified patent and that said Letters Patent is hereby corrected as shown below:

On the title page, Item
 (75) Inventor:

Peter A. Thompson, Toronto, Ontario and delete,

"Peter A. Thompson, Toronto, Calif."

Signed and Sealed this

Ninth Day of March, 1993

*Attest:*

STEPHEN G. KUNIN

*Attesting Officer*     Acting Commissioner of Patents and Trademarks